(12) United States Patent
Hupertz et al.

(10) Patent No.: US 6,488,052 B2
(45) Date of Patent: Dec. 3, 2002

(54) MULTILAYER TUBE FORMED OF PROFILED STRIP

(75) Inventors: Günter Hupertz, Wenden (DE); Dietmar Baumhof, Siegen (DE)

(73) Assignee: Westfalia Metallformtechnik GmbH & Co., Hilchenbach (DE)

( * ) Notice: Subject to any disclaimer, the term of this patent is extended or adjusted under 35 U.S.C. 154(b) by 0 days.

(21) Appl. No.: 10/100,497

(22) Filed: Mar. 18, 2002

(65) Prior Publication Data

US 2002/0148522 A1 Oct. 17, 2002

(30) Foreign Application Priority Data

Mar. 19, 2001 (DE) .......................................... 101 13 180

(51) Int. Cl.$^7$ ................................................. F16L 11/16
(52) U.S. Cl. ......................... 138/135; 138/136; 138/154
(58) Field of Search ................................. 138/135, 136, 138/154, 131, 134, 156

(56) References Cited

U.S. PATENT DOCUMENTS

| | | | | | |
|---|---|---|---|---|---|
| 2,402,497 A | * | 6/1946 | Johnson | ...................... | 138/135 |
| 3,815,639 A | * | 6/1974 | Westerbarkey | ............... | 138/122 |
| 3,862,146 A | * | 1/1975 | Boghosian | .................. | 549/259 |
| 4,029,129 A | * | 6/1977 | Harper | ........................ | 138/122 |
| 5,158,814 A | * | 10/1992 | Foti | ............................ | 138/122 |
| 5,758,695 A | * | 6/1998 | Carson | ........................ | 138/122 |
| 6,145,546 A | * | 11/2000 | Hardy et al. | ................. | 138/129 |
| 6,311,736 B2 | * | 11/2001 | Herman et al. | ............. | 138/131 |
| 6,378,561 B1 | * | 4/2002 | Thomas | ....................... | 138/135 |

FOREIGN PATENT DOCUMENTS

DE        34 41 064        5/1986

* cited by examiner

*Primary Examiner*—Patrick Brinson
(74) *Attorney, Agent, or Firm*—Herbert Dubno; Andrew Wilford

(57) ABSTRACT

A tube made of profiled strip has an inner edge, an outer edge parallel to the inner edge and projecting away from the inner edge, a double-thickness outwardly directed inner lip forming between the edges an outwardly open inner slot, and a double-thickness inwardly directed outer lip forming between the inner slot and the outer edge an inwardly open outer slot. The strip is formed into turns centered on an axis with the inner slot of each turn axially slidably receiving the outer lip of the adjacent turn on an inner side and the outer slot of each turn axially slidably receiving the inner lip of the adjacent turn on an outer side.

9 Claims, 3 Drawing Sheets

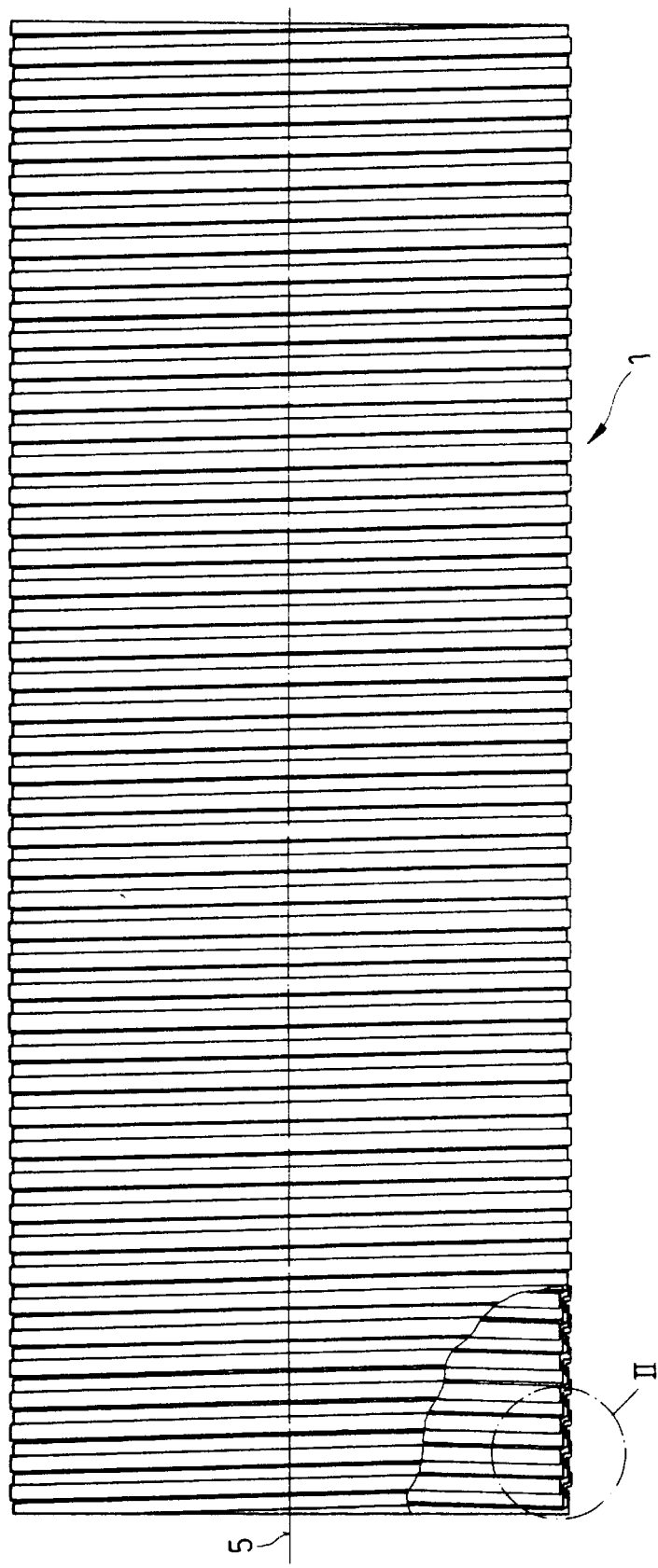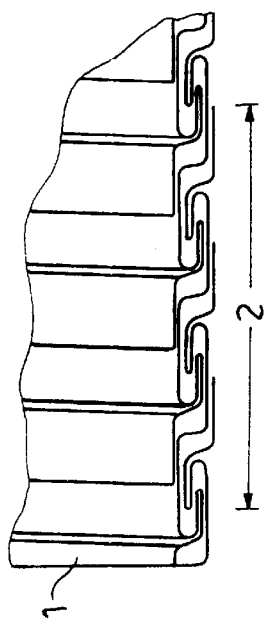

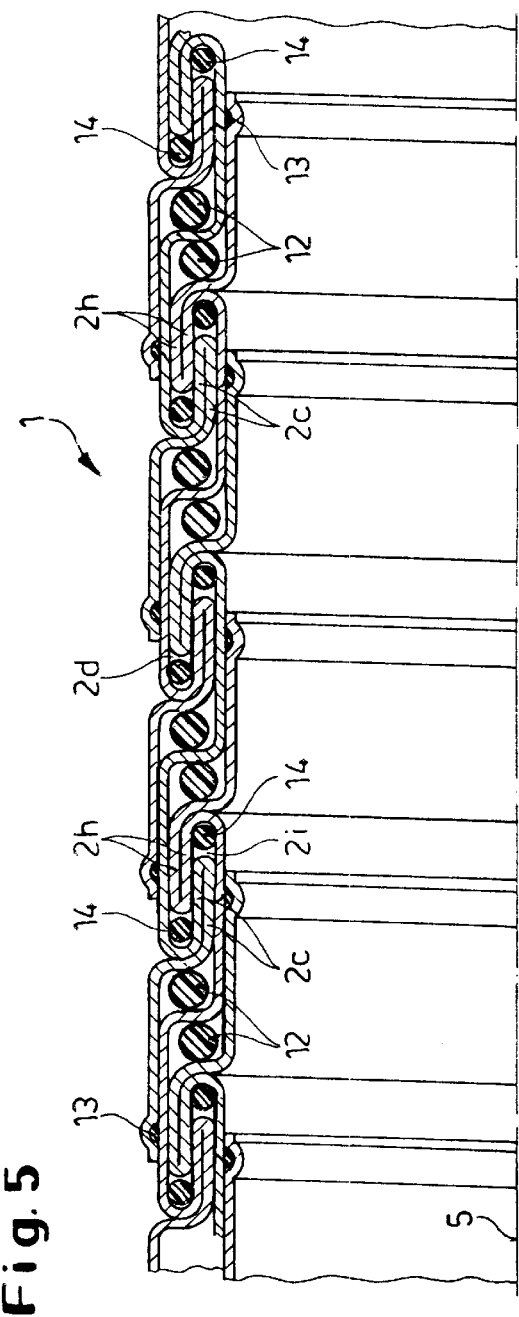
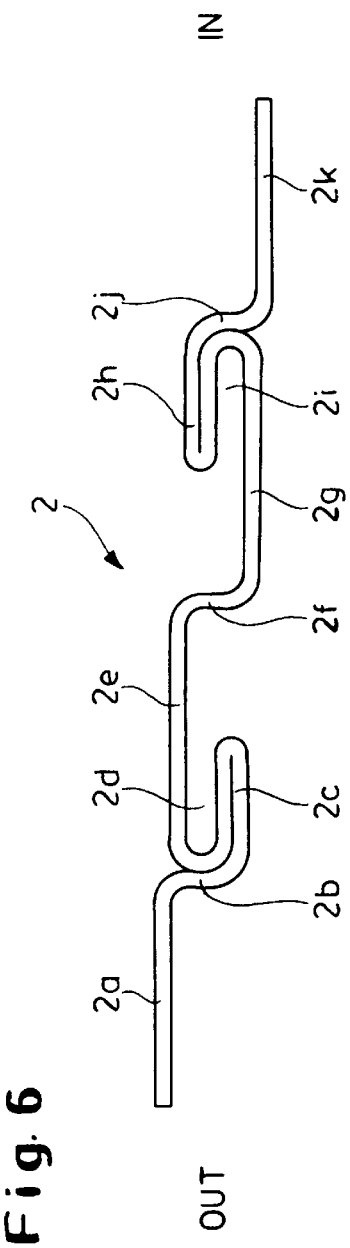
Fig. 5
Fig. 6

MULTILAYER TUBE FORMED OF PROFILED STRIP

FIELD OF THE INVENTION

The present invention relates to tubing. More particularly this invention concerns a multilayer tube formed of profiled strip.

BACKGROUND OF THE INVENTION

A multilayer tube formed of profiled strip is known from German patent document 3,441,064. The strip has inner and outer edges, is formed between them with a double-thickness outwardly directed lip defining an outwardly open inner slot, and is bent back under at its outer edge to form an inwardly open outer slot with the outer edge extending backward toward the inner edge. Where two turns of the strip material overlap, the outwardly directed double-thickness lip of each turn is engaged in the outer slot under the bent-back outer lip of the adjacent turn. Thus the turns are locked together and can shift limitedly relative to each other to allow the tube to be bent. What is more the interfit is so tight that the tube can easily be sealed to safely transport gas or liquid under pressure.

The disadvantage of this system is that, when stretched, relatively wide radially outwardly directed openings are formed that can catch and fill with dirt and the like. Furthermore the tube thus formed is at most two layers thick in many locations so it is not strong. The inner surface of the tube is shingled, with overlapping sections that make flow in the tube turbulent.

OBJECTS OF THE INVENTION

It is therefore an object of the present invention to provide an improved tube made of profiled strip.

Another object is the provision of such an improved tube made of profiled strip which overcomes the above-given disadvantages, that is which has smooth outer and inner surfaces even when bent or extended, and which is very strong.

SUMMARY OF THE INVENTION

A tube made of profiled strip has according to the invention an inner edge, an outer edge parallel to the inner edge and projecting away from the inner edge, a double-thickness outwardly directed inner lip forming between the edges an outwardly open inner slot, and a double-thickness inwardly directed outer lip forming between the inner slot and the outer edge an inwardly open outer slot. The strip is formed into turns centered on an axis with the inner slot of each turn axially slidably receiving the outer lip of the adjacent turn on an inner side and the outer slot of each turn axially slidably receiving the inner lip of the adjacent turn on an outer side.

As a result whether the tube is axially compressed or extended, the outer surface is generally smooth so particles cannot get between the turns. Furthermore at any point along the tube the strip is at least three layers thick, making it possible for the turns to seal well against each other and providing excellent strength. This makes the tube ideal for use passing hot motor-vehicle exhaust gas, as a tight seal and strength are needed for safety.

In accordance with the invention the inner slots are radially outward of the outer slots. In addition the inner edges are radially inward of the outer edges. Each turn is radially outwardly overlain by an outer-edge portion of the turn on the inner side and is radially inwardly overlain by an inner-edge portion of the turn on the outer side.

According to another feature of the invention respective inner and outer parallel helicoidal elastomeric seals flanking the strip between the slots thereof. The strip is formed between the lips with a web extending generally radially of the axis and the seals lie on opposite axial sides of the web.

It is also possible according to the invention to provide a seal compressed against an edge portions. This seal is compressed against an outer-edge portion.

BRIEF DESCRIPTION OF THE DRAWING

The above and other objects, features, and advantages will become more readily apparent from the following description, reference being made to the accompanying drawing in which:

FIG. 1 is a side view partly in section of a tube according to the invention;

FIG. 2 is a schematic large-scale view of the detail indicated at II in FIG. 1;

FIGS. 3, 4, and 5 are axial sections through tubes in accordance with the invention; and FIG. 6 is a large-scale end view of the strip that forms the tube according to the invention.

SPECIFIC DESCRIPTION

Figure 3:
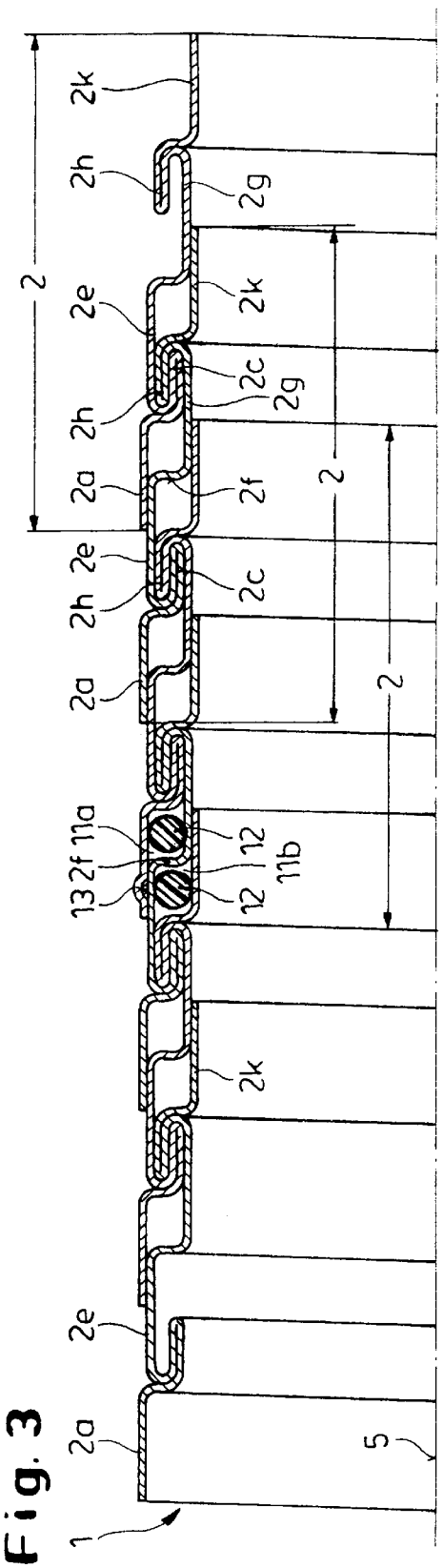

As seen in FIGS. 1 and 2 a tube 1 according to the invention is centered on an axis 5 and comprised of a single helicoidally wound strip 2 forming turns which overlap axially by two thirds. FIG. 6 shows how the strip 2 has an outer edge portion 2a that is connected by a radially inwardly projecting web 2b to a double-thickness lip 2c that extends axially and forms an axially inwardly (rightward) open slot 2d. A strip portion 2e extends inward of this slot 2d axially to a radial web 2f joined by another axially inwardly extending portion 2g to another double-thickness lip 2h that forms a slot 2i open axially outward (leftward). Another radial web 2j connects the lip 2h to an inner end portion 2k.

The lip 2c is axially aligned with the slot 2i and the lip 2h with the slot 2d and the inner and outer end portions 2a and 2k lie radially outward and inward of the rest of the strip 2. An outer face of the portion 2e is axially aligned with an inner face of the portion 2a and an inner face of the portion 2e is axially aligned with an outer face of the lip 2h. Similarly an outer face of the portion 2g is axially aligned with an inner face of the portion 2k and an inner face of the portion 2g is axially aligned with the outer face of the lip 2c. Each of the end portions 2a and 2k accounts for about one quarter of the axial length of the strip 2 so that, with the ⅔ overlap, about 11/12 of the inner surface of the tube 1 is formed by the outer end portions 2k and the same amount of the outer surface by the inner end portions 2a when the system is axially compressed as in FIG. 3.

Figure 4:
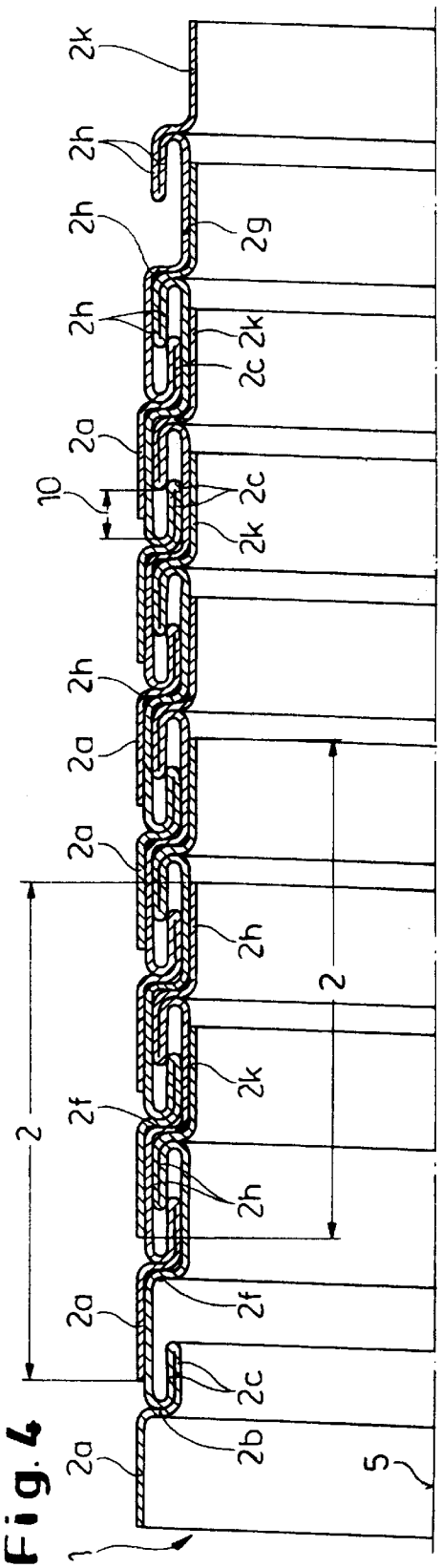

According to the invention the turns 2 are linked together by engagement of the lips 2h in the slots 2d and the lips 2c in the slots 2i of adjacent turns 2. More particularly assuming a turn 2 lying between two other turns 2 to the right (inward) and to the left (outward) as shown in FIG. 3, the outer lip 2c of each turn 2 will be hooked into the inner slot 2i of the turn to the left and the inner lip 2h will be hooked into the outer slot 2d of the turn 2 to the right, hence the ⅔ overlap. Since each turn 2 is hooked in opposite directions into the adjacent turns, an axial tension on the tube 1 will merely pull the turns apart as shown in FIG. 4, but will not separate them, while axial compression will push them together as shown in FIG. 3. The amount of axial shifting is shown at 10 in FIG. 4 and is shorter than the axial lengths of the end portions 2a and 2k to prevent an axial tension from pulling the turns 2 apart.

According to the invention as shown in FIG. 3 a pair of elastic seal cords 12 can run in spaces 11a and 11b flanking the web 2f and ensure a hermetic seal between adjacent turns. In addition the inner end portions 2a can be formed with radially inwardly open grooves holding further seals 13 that effectively prevent grit and the like from entering between the turns 2 from outside. FIG. 5 shows how further elastomeric seal cords 14 can be provided in the ends of the slots 2d and 2i.

We claim:

1. A tube made of profiled strip, the strip having;

an inner edge;

an outer edge parallel to the inner edge and projecting away from the inner edge;

a double-thickness inner lip directed outward toward the outer edge and forming between the edges an inner slot open outward toward the outer edge; and a double-thickness outer lip directed inward toward the inner edge and forming between the inner slot and the outer edge an outer slot open outward toward the inner edge, the strip being formed into turns centered on an axis with the inner slot of each turn axially slidably receiving the outer lip of the adjacent turn on an inner side and the outer slot of each turn axially slidably receiving the inner lip of the adjacent turn on an outer side.

2. The profiled-strip tube defined in claim 1 wherein the inner slots are radially outward of the outer slots.

3. The profiled-strip tube defined in claim 2 wherein the inner edges are radially inward of the outer edges.

4. The profiled-strip tube defined in claim 3 wherein each turn is radially outwardly overlain by an outer-edge portion of the turn on the inner side and is radially inwardly overlain by an inner-edge portion of the turn on the outer side.

5. The profiled-strip tube defined in claim 1, further comprising:

respective inner and outer parallel helicoidal elastomeric seals flanking the strip between the slots thereof.

6. The profiled-strip tube defined in claim 5 wherein the strip is formed between the lips with a web extending generally radially of the axis and the seals lie on opposite axial sides of the web.

7. The profiled-strip tube defined in claim 1, further comprising a seal compressed against an edge portions.

8. The profiled-strip tube defined in claim 7 wherein the seal is compressed against an outer-edge portion.

9. The profiled-strip tube defined in claim 1 wherein the outer slot is radially offset from the inner slot.

* * * * *